United States Patent
Park (10) Patent No.: US 9,258,767 B2
(45) Date of Patent: Feb. 9, 2016

(54) METHODS AND ARRANGEMENTS TO COMPRESS IDENTIFICATION

(71) Applicant: Intel IP Corporation, Santa Clara, CA (US)

(72) Inventor: Minyoung Park, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 13/931,916

(22) Filed: Jun. 29, 2013

(65) Prior Publication Data

US 2014/0192809 A1    Jul. 10, 2014

Related U.S. Application Data

(60) Provisional application No. 61/749,906, filed on Jan. 7, 2013.

(51) Int. Cl.
*H04W 48/16* (2009.01)
*H04W 48/12* (2009.01)

(52) U.S. Cl.
CPC .............. *H04W 48/16* (2013.01); *H04W 48/12* (2013.01)

(58) Field of Classification Search
None
See application file for complete search history.

(56) References Cited

U.S. PATENT DOCUMENTS

2004/0248549 A1* 12/2004 Drews ........................... 455/410
2008/0034268 A1    2/2008 Dodd et al.
2009/0319547 A1* 12/2009 Hollis ........................... 707/101
2012/0259822 A1   10/2012 Medgyesi et al.
2012/0314653 A1* 12/2012 Liu ............................... 370/328

FOREIGN PATENT DOCUMENTS

WO    2012/096549 A2    7/2012
WO    2014/107689 A1    7/2014

OTHER PUBLICATIONS

Fischer et al., "Compressed SSID Hashing", Broadcom, Dec. 12, 2012, 12 pages.
International Search Report and Written Opinion received for PCT Patent Application No. PCT/US2014/010390, mailed on Apr. 21, 2014, 12 pages.
International Preliminary Report on Patentability (Chapter 1) and Written Opinion received for PCT Patent Application No. PCT/US2014/010390, mailed on Jul. 7, 2015, 7 pages.

* cited by examiner

*Primary Examiner* — Hoon J Chung
*Assistant Examiner* — Zhensheng Zhang
(74) *Attorney, Agent, or Firm* — Schubert Law Group PLLC (57) ABSTRACT

Logic to reduce the probability of hashing collisions via a single hash function. Logic may hash the service set identification (SSID) to generate a compressed SSID and determine multiple compressed SSID segments based upon the compressed SSID. Logic may generate multiple SSID segments by hashing modified versions of the SSID or modifying hashed versions of the SSID. And logic may identify the compressed SSID segment with an index number. Logic may receive one or more compressed SSID segments, determine an index number associated with the segment(s) and compare the received SSID segment against a compressed SSID segment of an SSID that is sought. Logic may generate the multiple compressed SSID segments, store the segments in memory, and compare the compressed SSID segment received in a beacon with a corresponding compressed SSID segment in the memory.

15 Claims, 6 Drawing Sheets

- START (300)
- RECEIVING AN SSID (305)
- HASHING THE SSID TO DETERMINE, E.G., 16 OCTET COMPRESSED SSID (320)
- DETERMINING INDEX NUMBER OF SSID SEGMENTS FOR INDEX NUMBER (M) DIFFERENT BEACONS (325)
- GENERATING INDEX NUMBER (M) BEACONS, EACH BEACON HAVING A DIFFERENT SSID SEGMENT (330)
- END

FIG. 3B

- START (350)
- ROTATING SSID RIGHT BY AN INDEX NUMBER (M) CHARACTERS OR BITS (355)
- HASHING THE SSID WITH, E.G., 32-BIT HASH FUNCTION SUCH AS CRC32 TO DETERMINE A COMPRESSED SSID M THAT IS 4 OCTETS ASSOCIATED WITH INDEX NUMBER (M) (360)
- GENERATING BEACON FRAME M (INDEX NUMBER) WITH THE COMPRESSED SSID M (365)
- REPEATING ELEMENTS 355, 360, AND 365 M TIMES (370)
- END

FIG. 3C

- START (380)
- RECEIVING BEACON M AND DETERMINING M (385)
- GENERATING COMPRESSED SSID M AND COMPARING TO COMPRESSED SSID IN BEACON M (390)
- REPEATING ELEMENTS 385 & 390 ONE TO M OR MORE TIMES (395)
- END

METHODS AND ARRANGEMENTS TO COMPRESS IDENTIFICATION

TECHNICAL FIELD

The present disclosure relates generally to the field of wireless communications technologies. More particularly, the present disclosure relates to compressing a service set identification to reduce hashing collisions.

BACKGROUND

For some wireless communications devices, the service set identification (SSID) field may be compressed. This reduces the overhead of the SSID field in the Beacon frame. Due to the shortened size of the SSID, there is a chance for two different SSIDs resulting in the same compressed SSID value. This can be called a collision.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

References to "one embodiment," "an embodiment," "example embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

For Institute of Electrical and Electronic Engineers (IEEE) 802.11ah devices, the service set identification (SSID) field is compressed to 4 octets long using a 32 bit cyclic redundancy check (CRC32), which is used to calculate the frame check sequence (FCS) of a frame. This reduces the overhead of the SSID field in the Beacon frame.

Due to the shortened size of the SSID, there is a chance for two different SSIDs resulting in the same compressed SSID value. This can be called as a hashing collision. For example, two access points (APs) may have different SSIDs, like SSID-A and SSID-B, but the resulting compressed SSID values may be same such as 0×12345678.

When a station (STA) passively scans for an AP to associate, if there is a hashing collision between the two APs, the STA may need to repeat the association process to find the right AP with which to associate. For instance, when the STA is looking for an AP that has a particular compressed SSID, the STA does not know the medium access control (MAC) address of the AP. So if the STA receives a beacon that contains a compressed SSID that matches with the one that it is looking for, the STA may start the association process.

In many embodiments, the beacon may be the only broadcast message that has the potential to cause a hashing collision. In further embodiments, the hashing collision can also happen if a STA transmits a Probe request frame including the compressed SSID and any AP that has the same compressed SSID may respond to the request by sending Probe response frames to the STA.

One way to address this problem is to use more than one hash function, generate multiple compressed SSIDs based on the hash functions, and transmit them in different frames so that a STA can lower hashing collision probability by checking more than one frame with different compressed SSIDs. However, this process may have the drawback of requiring multiple hashing functions to generate compressed SSID values.

Embodiments may comprise logic such as hardware and/or code to reduce the probability of hashing collisions via a single hash function. Some embodiments may hash the SSID to generate a compressed SSID and determine multiple compressed SSID segments based upon the compressed SSID. Some embodiments may generate multiple SSID segments by hashing modified versions of the SSID or modifying hashed versions of the SSID. And many embodiments identify the compressed SSID segment with an index number to facilitate interpretation of the compressed SSID segment by a receiving station.

Further embodiments receive one or more compressed SSID segments, determine an index number associated with the segment and compare the received SSID segment against a compressed SSID segment of an SSID that is sought by the embodiment. Some embodiments may generate the multiple compressed SSID segments, store the segments in memory, and compare the compressed SSID segment received in the frame based upon a corresponding compressed SSID segment in the memory. Many embodiments may compare the compressed SSID segments associated with different index numbers against different compressed SSID segments in memory to attenuate the hash collisions.

Various embodiments may be designed to address different technical problems associated with communications of a compressed SSID in a frame such as a beacon frame, a probe request frame, and a probe response frame. For instance, some embodiments may be designed to address one or more technical problems such as generating and interpreting multiple different SSIDs for a device without implementing multiple hash functions.

Different technical problems such as those discussed above may be addressed by one or more different embodiments. For instance, some embodiments that are designed to address communications of a compressed SSID in a frame may do so by one or more different technical means such as determining an index number associated with a compressed SSID segment, generating multiple compressed SSID segments based upon the index number, communicating the index number via a separate field or via bits in the compressed SSID segments, and comparing the compressed SSID segment against a compressed SSID segment associated with the index number.

Some embodiments implement a one Megahertz (MHz) channel bandwidth for Institute of Electrical and Electronic Engineers (IEEE) 802.11ah systems. The lowest data rate in such embodiments may be approximately 6.5 Megabits per second (Mbps) divided by 20=325 Kilobits per second (Kbps). If two times repetition coding is used, the lowest data rate drops to 162.5 Kbps. In many embodiments, the lowest PHY rate is used for beacon and control frame transmissions. Although lowering the data rate may increase the transmission range, it takes much longer time to transmit a packet. According to one embodiment, the efficiency of the protocol may be improved to enable small battery-powered wireless devices (e.g., sensors) to use Wi-Fi to connect to the, e.g., Internet with very low power consumption.

Some embodiments implement Institute of Electrical and Electronic Engineers (IEEE) 802.11 systems such as IEEE 802.11ah systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf).

Several embodiments comprise access points (APs) for and/or client devices of APs or stations (STAs) such as routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smartdevices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Figure 1:
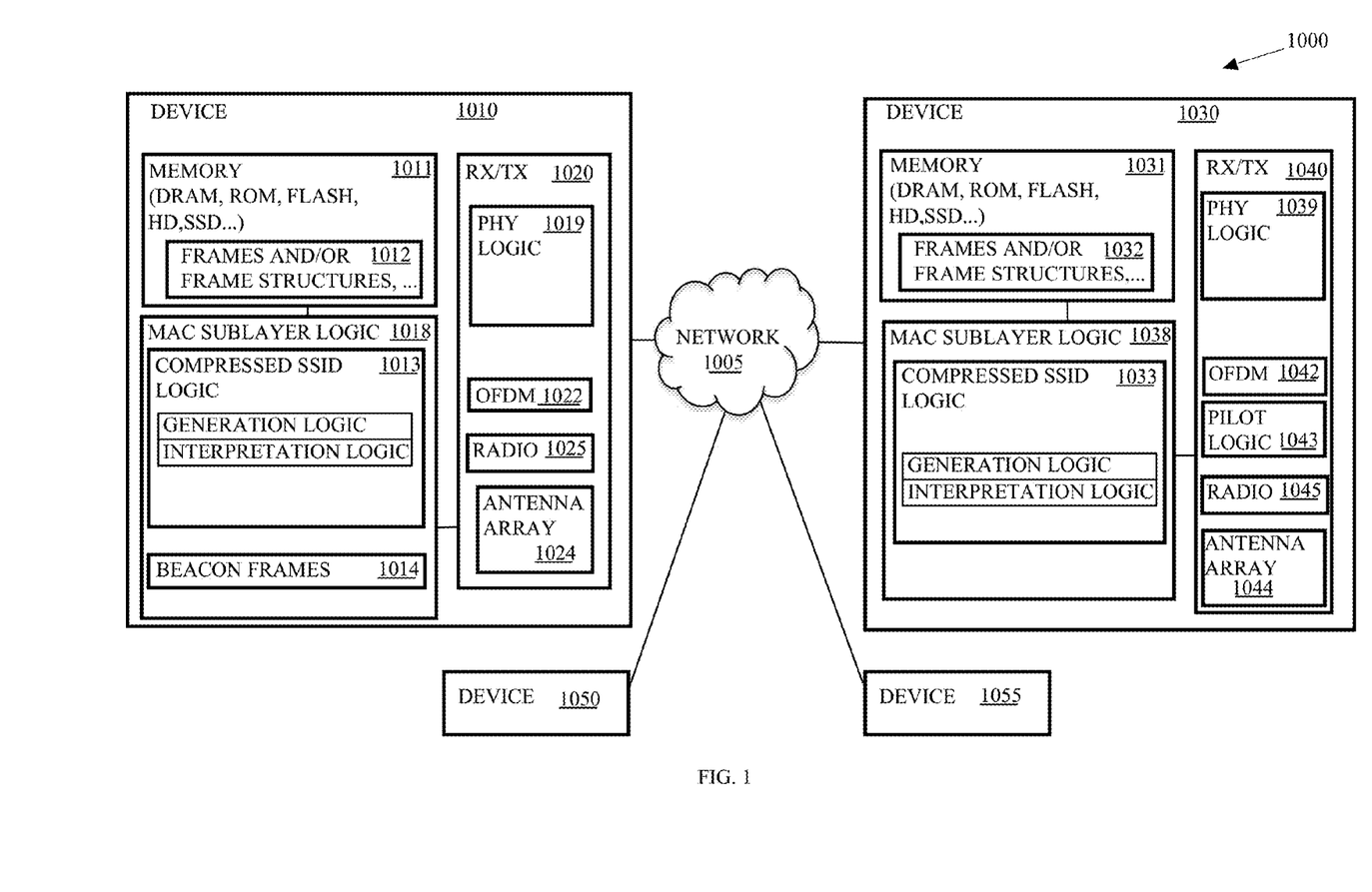
FIG. 1 depicts an embodiment of a wireless network comprising a plurality of communications devices, including multiple fixed or mobile communications devices.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications device 1030 may comprise a low power communications device such as a sensor, a consumer electronics device, a personal mobile device, or the like. And communications devices 1050 and 1055 may comprise sensors, stations, access points, hubs, switches, routers, computers, laptops, netbooks, cellular phones, smart phones, PDAs (Personal Digital Assistants), or other wireless-capable devices. Thus, communications devices may be mobile or fixed. For example, the communications device 1010 may comprise a metering substation for water consumption within a neighborhood of homes. Each of the homes within the neighborhood may comprise a sensor such as the communications device 1030 and the communications device 1030 may be integrated with or coupled to a water meter usage meter.

Figure 1A:
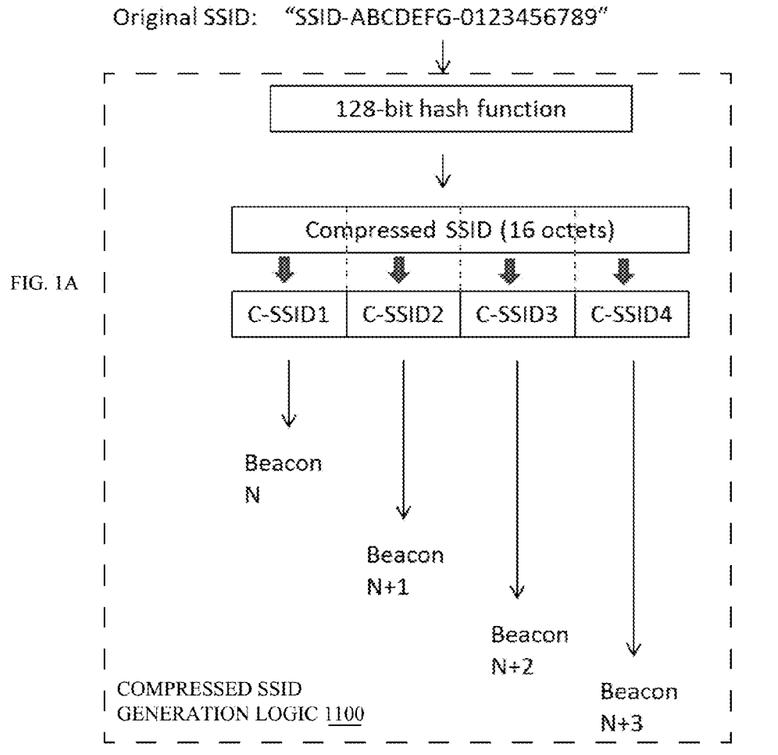
FIG. 1A depicts an embodiment of compressed service set identification (SSID) generation logic such as the compressed SSID generation logic illustrated in FIG. 1.

Initially, the communications device 1010 may comprise compressed SSID logic 1013, such as compressed SSID generation logic 1100 illustrated in FIG. 1A, to determine an index number (M), use a long hash function (e.g., 128-bit), and include a segment such as C-SSID1 of the long hash (compressed SSID 16 octets) as a compressed SSID in a beacon frame. In subsequent beacon frames, the compressed SSID logic 1013 may include one of the remainder of the compressed SSID segments such as C-SSID2, C-SSID3, and C-SSID4.

In the example illustrated in FIG. 1A, the compressed SSID generation logic 1100 hashes the original or complete SSID, "SSID-ABCDEFG-0123456789" with a 128-bit hash function to form a 16 octet compressed SSID. The compressed SSID generation logic 1100 may then segment the long hash into a number of segments, which is four segments in the present embodiment. Then, the compressed SSID generation logic 1100 transmits each of the four segments in some defined order. In the present embodiment, the compressed SSID generation logic 1100 transmits the first segment (C-SSID1) in Beacon N, the second segment (C-SSID2) in the subsequent Beacon N+1, the third segment (C-SSID3) in the subsequent Beacon N+2, and the fourth segment (C-SSID4) in the subsequent Beacon N+3. In other embodiments, the compressed SSID generation logic 1100 may transmit the segments in Probe Request frames. The actual order can vary between embodiments and the purpose is to differentiate the SSID of the communications device 1010 from the SSIDs of other access points. In some embodiments, the compressed SSID generation logic 1100 may incorporate logic to compare hashed SSID segments generated by the communications device 1010 against the hashed SSID segments of the other access points to determine which, if any, of the compressed segments match. In such embodiments, the compressed SSID generation logic 1100 may not transmit the matching compressed segment or may transmit that segment with less frequency than the frequency of inclusion of the remainder of the segments in the beacon frames.

In other words, instead of using multiple hash functions (or algorithms) to generate multiple compressed SSIDs, the communications device 1010 may use a single but longer hash function to generate a long compressed SSID and then transmit different portions (or compressed SSID segments) of the long compressed SSID in different beacons or probe request frames. For example, if the length of the compressed SSID generated by the hash function was 16 bytes (128 bits), divide the compressed SSID into four segments and put them in four different beacons. In this example, the four segments of the compressed SSID may be repeated every four beacons. In another embodiment, for example, the compressed SSID generation logic 1100 may generate a 256-bit hash with a 256-bit hash function and divide the long compressed SSID into eight segments. In still other embodiments, the compressed SSID generation logic 1100 may transmit larger or smaller compressed SSID segments such that, e.g., the 128-bit hash may be divided into two compressed SSID segments or eight segments.

A STA such as the communications device 1030 that receives the beacons from the communications device 1010 may comprise compressed SSID interpretation logic 1033 with interpretation logic to generate a sought compressed SSID of the SSID that the communications device 1030 seeks to associate and may compare segments of the sought compressed SSID against corresponding segments received via the beacons. For instance, the communications device 1030 may receive the compressed SSID segment from the communications device 1010 in the form of a beacon frame or a probe response frame. The communications device 1030 may decode the index (M) from an information element in the beacon frame to determine the particular compressed SSID segment that is included in the beacon frame and may generate a sought compressed SSID segment from the SSID of an access point with which the communications device 1030 seeks to associate. After generating the sought segment that corresponds to the index (M) received in the beacon frame or probe response frame, the communications device 1030 may compare the sought compressed SSID segment against the received SSID segment to determine if the segments match.

If the sought and received segments match, in some embodiments, the compressed SSID interpretation logic 1033 may determine whether the received compressed SSID segment uniquely identifies the communications device 1010 amongst the available or nearby access points. In some instances, at least one of the compressed SSID segments associated with access points will be the same, causing the communications device 1030 to be unable to identify an access point as the access point to which the communications device 1030 seeks to associate. In some of these embodiments, the communications device 1030 may comprise a list of one or more access points in, e.g. memory 1031, with which the communications device 1030 is instructed to associate. For example, the index (M) may represent a segment of a sought compressed SSID that is the same compressed SSID for more than one of the access points in a list of nearby access points that is also stored in the memory 1031. In such instances, the compressed SSID logic 1033 may determine that the received compressed SSID segment matches a sought compressed SSID segment from the list of access points with which to associate by comparing the received compressed SSID segment to sought segments. However, the compressed SSID logic 1033 may also compare the received segment or the matching sought segment against compressed SSID segments in the list of nearby access points to determine whether the particular segment identifies more than one access point rather than uniquely identifying a single access point.

If the received compressed SSID segment does not uniquely identify the single, sought access point, the compressed SSID logic 1033 may determine that the communications device 1030 should receive one or more additional segments from the communications device 1010. The compressed SSID logic 1033 may uniquely identify the communications device 1010 as the access point to which the communications device 1030 seeks to associate based upon one or more of the additional segments. In many embodiments, the compressed SSID logic 1033 may uniquely identify the communications device 1010 before the communications device 1030 attempts to associate with the communications device 1010.

In other embodiments, an AP such as the communications device 1010 may use a single hash function plus shifted versions of the original SSID value as inputs to the hash function. Such embodiments may generate multiple SSIDs using a single short hash function like CRC32 but use different sequences of the original SSID value as the inputs to the hash function. For example, shifted versions of the original SSID value can be used as the inputs of the hash function as illustrated in FIG. 1B.

Figure 1B:
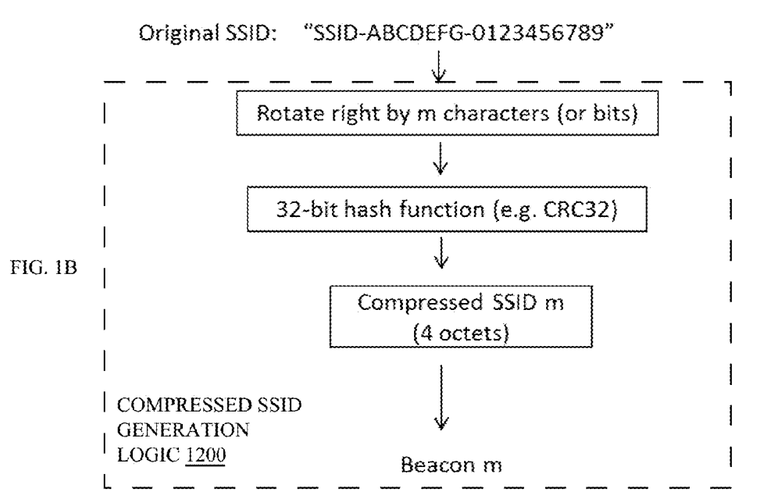
FIG. 1B depicts an alternative embodiment of compressed service set identification (SSID) generation logic such as the compressed SSID generation logic illustrated in FIG. 1.

In FIG. 1B, the compressed SSID generation logic 1200 may rotate the original SSID, "SSID-ABCDEFG-0123456789", by M characters or bits, hash the rotated SSID with a 32-bit hash function such as CRC32, and transmit the compressed SSID segment along with the index M in a Beacon M. Each beacon may contain the index number (M) of the compressed SSID, which indicates how many characters (or bits) of the original SSID are rotated. In several embodiments, the index number (M) may be included in a separate field in the beacon frame or probe request frame.

In further embodiments, instead of having a separate field, the index number (M) may be part of the compressed SSID segment by replacing the first r bits of the compressed SSID segment with the index number M. If the received compressed SSID segment was 32 bits long, a STA may only use the last (32-r) bits of the compressed SSID segment in the beacon or probe request for comparison.

When a STA such as the communications device 1030 receives a beacon or probe request, it decodes the index number (M) and rotates by M characters (or bits) of the SSID it is looking for and then generates a compressed SSID using the same hash function (e.g., CRC32). The communications device 1030 may compare the received compressed SSID in the beacon with the compressed SSID that the communications device 1030 generated.

If, as discussed above, the two compressed SSID segments match but the received compressed SSID segment does not uniquely identify a single, sought access point, the compressed SSID logic 1033 of the communications device 1030 may determine to check the next few beacons to reduce the hashing collision probability. The compressed SSID logic 1033 may make such a determination by comparing the compressed SSID segment against a list of compressed SSID segments that are or may be in the vicinity and may also be associated with the index number (M).

The index number M may be randomly generated, sequentially generated, or generated by other means. In many embodiments, the compressed SSID logic 1033 may create the set of index numbers M or restrict the generation of index numbers M to facilitate identification of the original SSID by a receiving device after a particular number of beacon transmissions.

In further embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, medium access control (MAC) sublayer logic 1018 and 1038, and physical layer (PHY) logic 1019 and 1039, respectively. The memory 1011 and 1031 may comprise a storage medium such as dynamic random access memory (DRAM), read only memory (ROM), buffers, registers, cache, flash memory, hard disk drives, solid-state drives, or the like. The memory 1011 and 1031 may store frames and/or frame structures, or portions thereof such as structures for an association request frame, an association response frame, a probe frame, and the like. In some embodiments, the memory 1011 and 1031 may comprise instructions to perform the operations of determining more than one compressed SSID segments, transmitting the more than one compressed SSID segments in different beacons or probe requests, determining an index number, generating more than one compressed SSID segments associated with the index numbers, and comparing the corresponding compressed SSID segment received in one or more beacons or probe requests against a generated compressed SSID segment to determine whether the AP associated with the beacon or probe request is the AP with which the STA sought to associate. In some embodiments, the memory 1011 and 1031 may also comprise instructions to compare segments of compressed SSIDs of access point with which the STA is instructed to associate against corresponding segments of known access points in the vicinity or at least segments of access points thought to be in the vicinity.

Figure 1C:
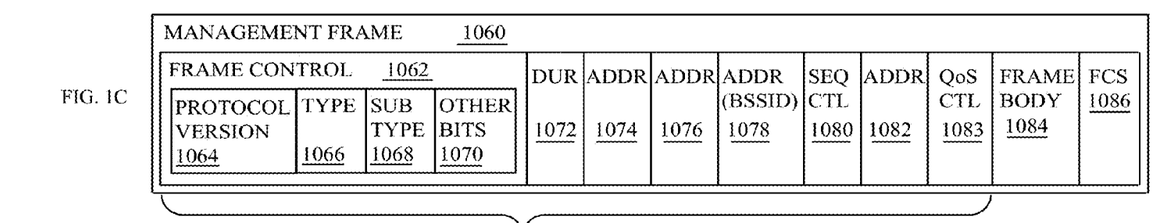
FIG. 1C depicts an embodiment of a management frame such as the beacon frame illustrated in FIG. 1.

FIG. 1C illustrates a management frame 1060 such a beacon frame or probe request frame. In the embodiment illustrated in FIG. 1A, the management frame comprises a MAC header 1061 followed by a frame body field 1084 and a frame check sequence (FCS) field 1086. The frame body field 1084 may comprise one or more frames also referred to as MAC sublayer Service Data Units (MSDUs). The frame body 1084 may be a variable number of octets such as zero to 2312 octets and may include data elements, control elements, or parameters and capabilities. For instance, the MAC sublayer logic 1018 of the communications device 1010 may insert an SSID information element (IE) in the frame body 1084 that comprises an index number (M) and the compressed SSID segment that corresponds to the index number (M). In some embodiments, such an information element may also comprise an indication of the number of bits (R) of the compressed SSID segment that is occupied by the index number (M). The FCS field 1086 may include extra checksum characters added to the management frame 1060 for error detection and correction.

The MAC header 1061 may comprise the frame control field 1062, a duration/identifier (DUR/ID) field 1066, an address (ADDR) field 1074, an ADDR field 1076, an ADDR field 1078, a Sequence Control (SEQ CTL) field 1080, an ADDR field 1082, and a quality of service control (QoS CTL) field 1083. The frame control field 1062 may identify the type and subtype of the frame such as a management type and beacon subtype. One or more of the fields ADDR 1076, ADDR 1078, Sequence Control 1080, ADDR 1082, QoS control 1083, and frame body 1084 may only be present in certain frame types and subtypes of the management frames. In further embodiments, beacon frames or probe request frames may comprise one or more other fields and/or one or more of these fields with a truncated or compressed format with respect to the fields of the corresponding standard frame.

The frame control field 1062 may comprise a protocol version field 1064, a type field 1066, a subtype field 1068, and other frame control bits 1070. The protocol version field 1064 may represent the revision of the corresponding standard that the frame represents. The type field 1066 may identify the type of management frame 1060 as, e.g., a management frame. The subtype field 1068 may identify the subtype of the management frame 1060 as, e.g., a beacon frame or a probe request frame. And after the subtype field 1068 may be other bits 1070 that may be used for additional frame control field parameters.

Figure 1D:
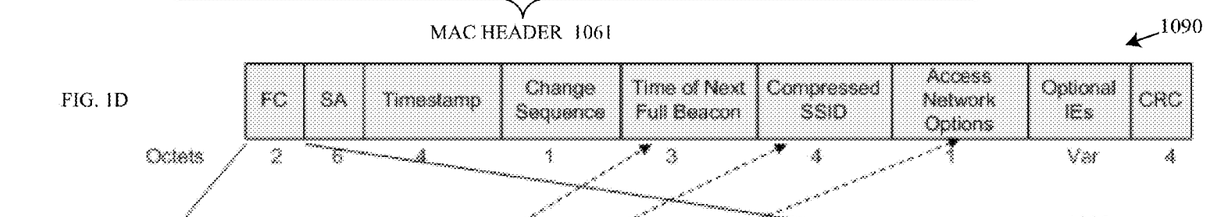
FIG. 1D depicts an embodiment of a short beacon frame such as the beacon frame illustrated in FIG. 1.
Figure 1E:
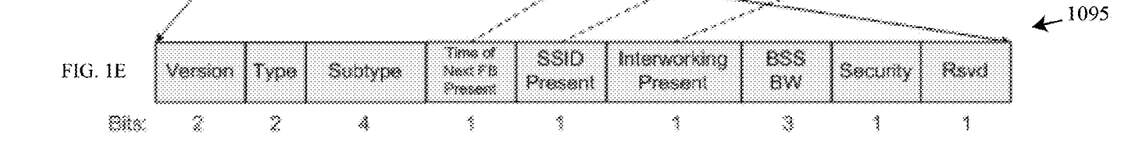
FIG. 1E depicts an embodiment of a frame control field of a short beacon frame such as the beacon frame illustrated in FIG. 1D.
Figure 1F:
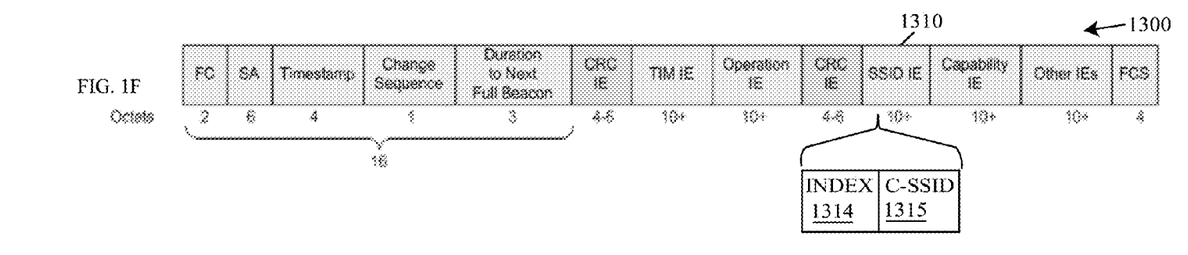
FIG. 1F depicts an embodiment of a MID-CRC beacon frame such as the beacon frame illustrated in FIG. 1 to help a station stop processing a long beacon earlier and save power.

FIGS. 1D and 1F illustrate alternative versions of a beacon frame that the MAC sublayer logic 1018 of the communications device 1010 may generate and which may comprise a compressed SSID segment along with an index number (M). FIG. 1D illustrates a short beacon frame 1090 that includes fields such as a frame control (FC) field, a source address (SA) field, a change sequence field, a time to next full beacon field, the compressed SSID field, an access network options field, an optional IEs field, and a cyclic redundancy check (CRC) field. In the compressed SSID may be included in the compressed SSID field of the short beacon 1100 or as an IE in the optional IEs field. Furthermore, the index (M) may be included in the compressed SSID field, as an additional field added to the short beacon, or in an IE in the optional IEs field.

FIG. 1E illustrates an embodiment of the FC field 1095 that can be included in the short beacon 1090. The FC field 1095 may comprise a version field, a type field and a subtype field that may be indicative of the short beacon frame, an indicator of the presence or absence of the time of next full beacon field, and an indicator of the presence or absence of the compressed SSID segment being in the compressed SSID field. In some embodiments in which the compressed SSID segment is included in an IE, the SSID present field may indicate that the compressed SSID field of the short beacon is not present. The FC field 1095 may also comprise an indicator of the presence or absence of the access network options field, a security field, and possibly another field that may or may not be defined.

FIG. 1F illustrates a MID-CRC IE beacon frame 1300. The Mid-CRC IE beacon frame 1300 includes one or more CRC IE fields around the middle of the frame. The CRC IE fields can help a STA stop processing a long beacon earlier and save power if the STA will not use the information that follows the CRC IE field in the beacon frame. More specifically, the CRC-IE field includes a CRC that allows the receiving device to perform a cyclic redundancy check on the fields that precede the CRC field. The Mid-CRC IE beacon frame 1300 may include an SSID IE field 1310 that can comprise the index 1314 and the compressed SSID segment (C-SSID) 1315. In other embodiments, the index number (M) and the compressed SSID segment may be included in the other IEs field as an IE.

Referring again to FIG. 1, the MAC sublayer logic 1018, 1038 may comprise logic to implement functionality of the MAC sublayer of the data link layer of the communications device 1010, 1030. The MAC sublayer logic 1018, 1038 may generate the frames such as management frames, data frames, and control frames. The PHY logic 1019, 1039 may generate physical layer protocol data units (PPDUs) based upon the frames 1014. More specifically, the frame builders may generate frames 1014 and the data unit builders of the PHY logic 1019, 1039 may prepend the frames 1014 with preambles to generate PPDUs for transmission via a physical layer device such as the transceivers (RX/TX) 1020 and 1040.

The frame 1014, also referred to as MAC layer Service Data Units (MSDUs), may comprise a management frame. For example, frame builder may generate a management frame such as the long beacon, a MID-CRC beacon frame, or a short beacon frame to identify the communications device 1010 as having capabilities such as supported data rates, privacy settings, quality of service support (QoS), power saving features, cross-support, and/or a service set identification (SSID) of the network to identify the network to the communications device 1030.

The communications devices 1010, 1030, 1050, and 1055 may each comprise a transceiver such as transceivers 1020 and 1040. Each transceiver 1020, 1040 comprises a radio 1025, 1045 comprising an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs. And guard intervals may be inserted between symbols such as between every OFDM symbol as well as between the short training field (STF) and long training field (LTF) symbols in the front end of the transmitter during transmission to avoid inter-symbol interference (ISI), which might result from multi-path distortion.

Each transceiver 1020, 1040 comprises a radio 1025, 1045 comprising an RF transmitter and an RF receiver. The RF transmitter comprises an OFDM module 1022, which impresses digital data, OFDM symbols encoded with tones, onto RF frequencies, also referred to as sub-carriers, for transmission of the data by electromagnetic radiation. In the present embodiment, the OFDM module 1022 may impress the digital data as OFDM symbols encoded with tones onto the sub-carriers to for transmission. The OFDM module 1022 may transform information signals into signals to be applied via the radio 1025, 1045 to elements of an antenna array 1024.

In some embodiments, the communications device 1010 optionally comprises a Digital Beam Former (DBF) 1022, as indicated by the dashed lines. The DBF 1022 transforms information signals into signals to be applied to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 2:
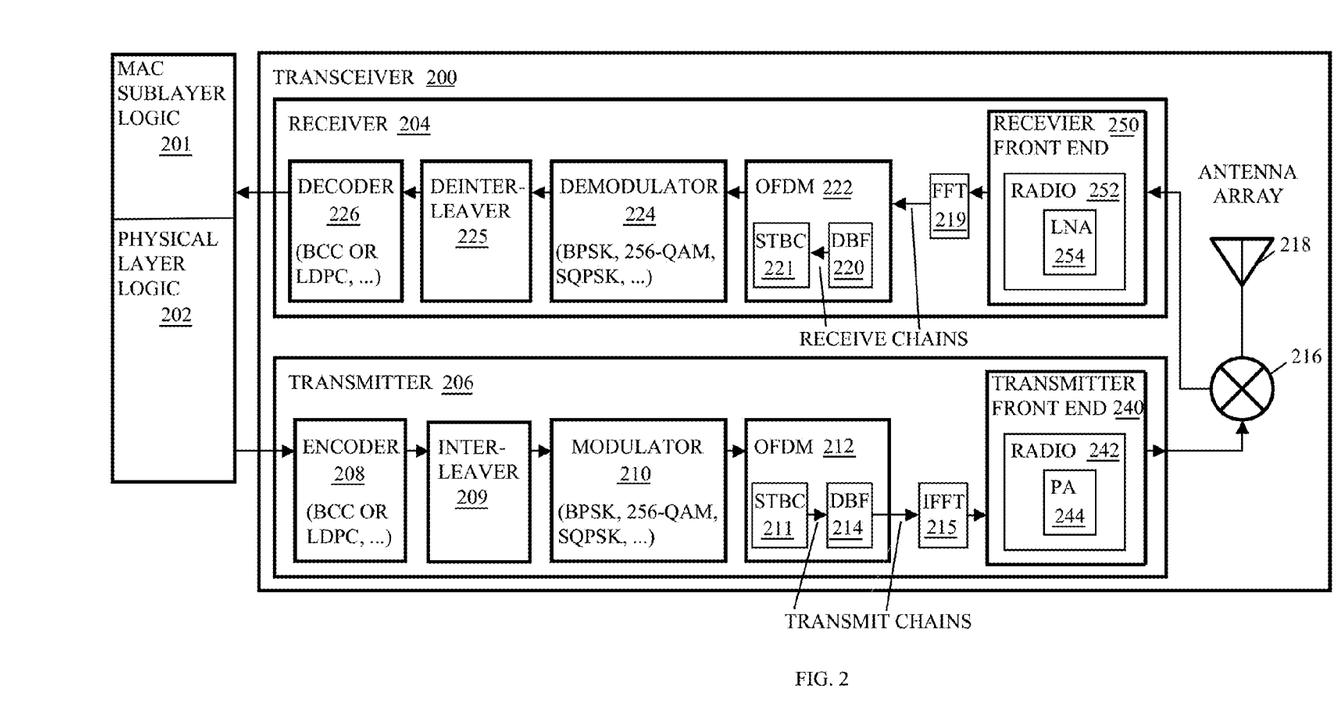
FIG. 2 depicts an embodiment of an apparatus to generate, transmit, receive and interpret a frame with a compressed SSID segment.

FIG. 2 depicts an embodiment of an apparatus to generate, transmit, receive, and interpret or decode frames. The apparatus comprises a transceiver 200 coupled with Medium Access Control (MAC) sublayer logic 201 and a physical layer (PHY) logic 250. The MAC sublayer logic 201 may determine a frame and the physical layer (PHY) logic 250 may determine the PPDU by prepending the frame or multiple frames, MAC protocol data units (MPDUs), with a preamble to transmit via transceiver 200. For example, a frame builder may generate a frame including a type field that specifies whether the frame is a management, control or data frame and a subtype field to specify the function of the frame. A control frame may include a Ready-To-Send or Clear-To-Send frame. A management frame may comprise a Beacon, Probe Request/Response, Association Request/Response, and Reassociation Request/Response frame type. And the data type frame is designed to transmit data.

In many embodiments, the MAC sublayer logic 201 may comprise a frame builder 202 to generate frames and compressed SSID logic such as compressed SSID generation logic and/or compressed SSID interpretation logic discussed in conjunction with FIGS. 1, 1A, and 1B. The PHY logic 250 may comprise a data unit builder 203. The data unit builder 203 may determine a preamble to prepend the MPDU or more than one MPDUs to generate a PPDU. In many embodiments, the data unit builder 203 may create the preamble based upon communications parameters chosen through interaction with a destination communications device. The preamble may comprise training sequences such a short training field (STF) and a long training field (LTF) to provide initial channel updates to the receiving device to allow the receiving device to update weight coefficients for a weighting function implemented by an equalizer in the receiving device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid.

The output of modulator 209 is fed to an orthogonal frequency division multiplexing (OFDM) module 212. The OFDM module 212 may comprise a space-time block coding (STBC) module 211, a digital beamforming (DBF) module 214, and an inverse, fast Fourier transform (IFFT) module 215. The STBC module 211 may receive constellation points from the modulator 209 corresponding to one or more spatial streams and may spread the spatial streams to a greater number of space-time streams (also generally referred to as data streams). Further embodiments may omit the STBC.

The OFDM module 212 impresses or maps the modulated data formed as OFDM symbols onto a plurality of orthogonal sub-carriers so the OFDM symbols are encoded with the sub-carriers or tones. In some embodiments, the OFDM symbols are fed to the Digital Beam Forming (DBF) module 214. Generally, digital beam forming uses digital signal processing algorithms that operate on the signals received by, and transmitted from, an array of antenna elements.

The Inverse Fast Fourier Transform (IFFT) module 215 may perform an inverse discrete Fourier transform (IDFT) on the OFDM symbols. The output of the IFFT module 215 may enter the transmitter front end 240. The transmitter front end 240 may comprise a radio 242 with a power amplifier (PA) 244 to amplify the signal and prepare the signal for transmission via the antenna array 218. The signal may be up-converted to a higher carrying frequency or may be performed integrally with up-conversion. Shifting the signal to a much higher frequency before transmission enables use of an antenna array of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal. In other embodiments, the transceiver 200 may comprise one or more antennas rather than antenna arrays and, in several embodiments, the receiver 204 and the transmitter 206 may comprise their own antennas or antenna arrays.

The transceiver 200 may comprise a receiver 204 for receiving, demodulating, and decoding information bearing communication signals. The receiver 204 may comprise a receiver front-end to detect the signal, detect the start of the packet, remove the carrier frequency, and amplify the subcarriers via a radio 252 with a low noise amplifier (LNA) 254. The communication signals may comprise, e.g., 32 tones on a 1 MHz carrier frequency. The receiver 204 may comprise a fast Fourier transform (FFT) module 219. The FFT module 219 may transform the communication signals from the time domain to the frequency domain.

The receiver 204 may also comprise an OFDM module 222, a demodulator 224, a deinterleaver 225, and a decoder 226, and the equalizer 258 may output the weighted data signals for the OFDM packet to the OFDM module 222. The OFDM 222 extracts signal information as OFDM symbols from the plurality of subcarriers onto which information-bearing communication signals are modulated.

The OFDM module 222 may comprise a DBF module 220, and an STBC module 221. The received signals are fed from the equalizer to the DBF module 220 transforms N antenna signals into L information signals. And the STBC module 221 may transform the data streams from the space-time streams to spatial streams.

The demodulator 224 demodulates the spatial streams. Demodulation is the process of extracting data from the spatial streams to produce demodulated spatial streams. The method of demodulation depends on the method by which the information is modulated onto the received carrier signal and such information is included in the transmission vector (TX-VECTOR) included in the communication signal. Thus, for example, if the modulation is BPSK, demodulation involves phase detection to convert phase information to a binary sequence. Demodulation provides to the deinterleaver 225 a sequence of bits of information.

The deinterleaver 225 may deinterleave the sequence of bits of information. For instance, the deinterleaver 225 may store the sequence of bits in columns in memory and remove or output the bits from the memory in rows to deinterleave the bits of information. The decoder 226 decodes the deinterleaved data from the demodulator 224 and transmits the decoded information, the MPDU, to the MAC sublayer logic 202.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing.

The MAC sublayer logic 201 may parse the MPDU based upon a format defined in the communications device for, e.g., a short beacon frame to determine the particular type of frame by determining the type value and the subtype value. The MAC sublayer logic 201 may then parse and interpret the remainder of MPDU based upon the definition for the short frame of the particular type and subtype indicated in the MAC header. For instance, the MAC sublayer logic may parse the frame to determine an index number (M) and a compressed SSID segment. The MAC sublayer logic may then look up compressed SSID segments associated with the index number (M) to which the station seeks to associate and compares the compressed SSID segment received in the beacon frame against compressed SSID segments in memory or generated from SSIDs in memory.

Figure 3A:
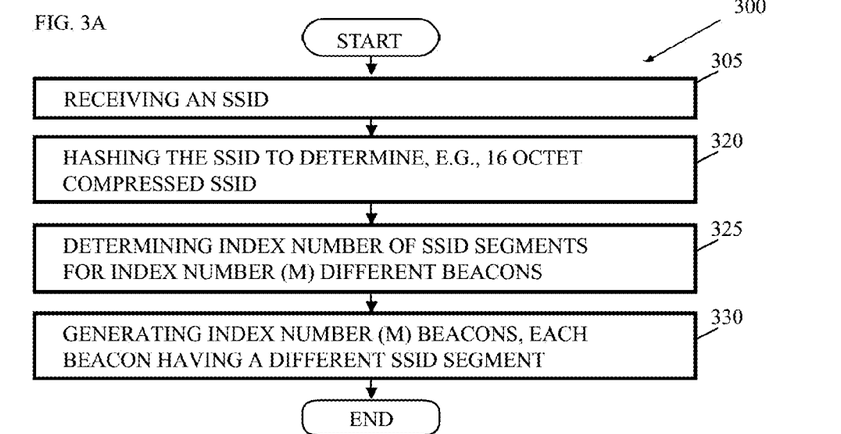
FIG. 3A-C depict embodiments of flowcharts to generate an index number (M) of beacon frames with M different SSID segments; and to parse and interpret the M beacon frames.
Figure 3B:
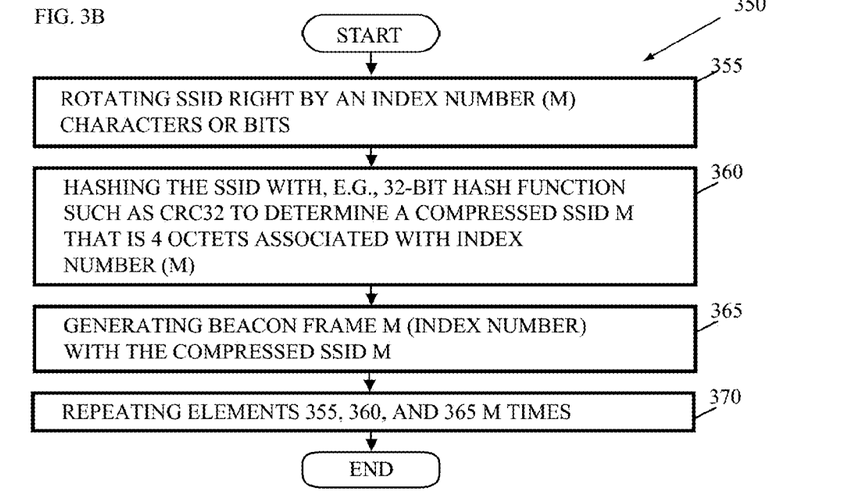
Figure 3C:
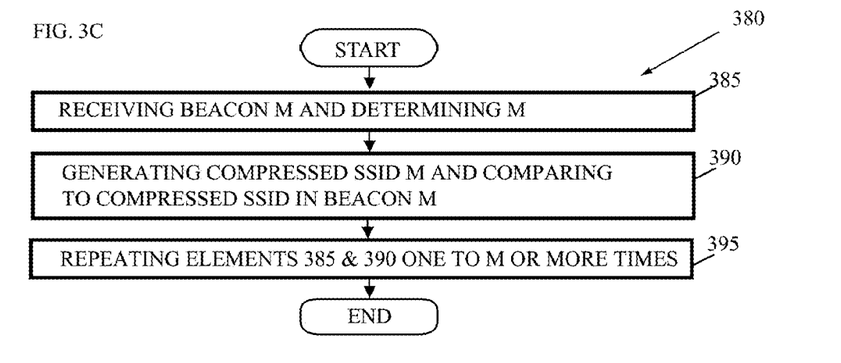

FIGS. 3A-C depict embodiments of flowcharts to generate an index number (M) of beacon frames with M different SSID segments; and to parse and interpret the M beacon frames. Referring to FIG. 3A, the flowchart 300 may begin with a communications device receiving an SSID (element 305). The SSID may comprise the SSID of an access point that is the SSID of the communications device or may be the SSID of an access point with which the communications device seeks to associate.

After receiving the SSID, the compressed SSID logic such as the compressed SSID generation logic and/or the compressed SSID interpretation logic illustrated in FIG. 1 may hash the SSID to determine, e.g., a long hash of the SSID such as a 16 octet compressed SSID (element 320). The long hash of the SSID may be segmented or split into M segments of equal lengths for M different beacon frame transmissions (element 325). For instance, if the communications device is an access point, the segments may be generated for transmission in beacons. If, however, the communications device is a station such as a sensor, the segments may be stored in memory or utilized to compare against c=received compressed SSID segments as they are received in beacon transmissions from one or more access points.

For embodiments of access points, the communications device may then generate M beacons, each having a different compressed SSID segment (element 330). For instance, the communications device may transmit the beacons at regular intervals and include a different compressed SSID segment in each of M different beacon transmissions. In other embodiments, the same or similar process as flowchart 300 may be implemented to generate Probe Request frames by, e.g., a communications device to request information from an access point.

Referring to FIG. 3B, the flowchart 350 may begin with a communications device rotating an SSID right by an index number (M) characters or bits (element 355). For instance, the compressed SSID logic such as the compressed SSID generation logic and/or the compressed SSID interpretation logic illustrated in FIG. 1 of the communications device may rotate the SSID between generating hashes of the SSID so that a single hash function may generate multiple different compressed SSID segments from the same SSID.

After rotating the SSID, the communications device may hash the SSID with, e.g., a 32-bit hash function such as a CRC32 to determine a compressed SSID segment M that is 4 octets associated with the index number (M) (element 360). The communications device may generate the segments as they are to be transmitted in a beacon or as beacons are received with corresponding compressed SSID segments, or the communications device may generate all the segments for one or more SSIDs and store the segments in memory.

After generating one or more of the compressed SSID segments, the communications device may generate a beacon frame M comprising the index number (M) and the compressed SSID segment associated with the index number M (element 365). In some embodiments, the index number (M) may be associated with a sequence number that is transmitted along with the beacon frame. The communications device may then repeat actions described in the elements 355, 360, and 365 a number of times (element 370) until the SSID can be determined from the compressed SSID segments. In other embodiments, the number of different compressed SSID segments may be more or less than number needed to determine the original SSID from the compressed SSID segments. In further embodiments, the same or similar process as flowchart 350 may be implemented to generate Probe Request frames by, e.g., a communications device to request information from an access point.

Referring to FIG. 3C, the flowchart 380 may begin with a communications device receiving a beacon M and determining the index number (M) (element 380). For instance, compressed SSID interpretation logic illustrated in FIG. 1 of the communications device may decode one or more fields in the beacon frame to determine the index number (M). After determining the index number (M), the communications device can associate the compressed SSID segment with a particular hash operation of a single hash function. For instance, the index number (M) may indicate that the compressed SSID segment M included in the beacon M is the Mth segment of a long hash generated by the single hash function. In other embodiments, the index number (M) may indicate that the compress SSID segment is generated by rotating the original SSID by M characters or bits and performing a hash of the rotated SSID. In some embodiments, the index number (M) is a separate field in the beacon and, in some embodiments, the index number M is R characters or bits of the compressed SSID segment received in the beacon frame. The communications device may then repeat actions described in the elements 385 and 390 a number of times (element 395) until the communications device can identify the source of the compressed SSID segments as the access point to which the communications device seeks to associate. In other embodiments, an access point receiving a Probe Request frame from, e.g., a communications device to request information from the access point may implement to the same or similar process as flowchart 380.

Figure 4A:
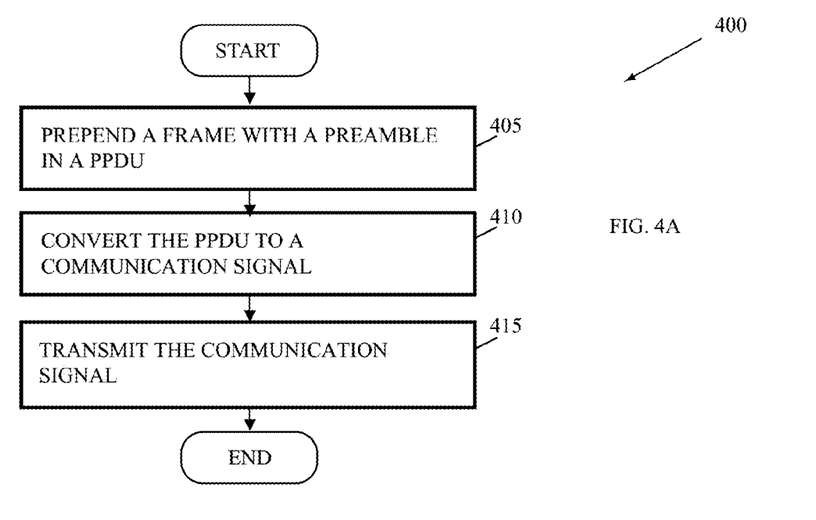
FIGS. 4A-B depict embodiments of flowcharts to transmit, receive, and interpret communications with a compressed SSID segment as illustrated in FIG. 2.
Figure 4B:
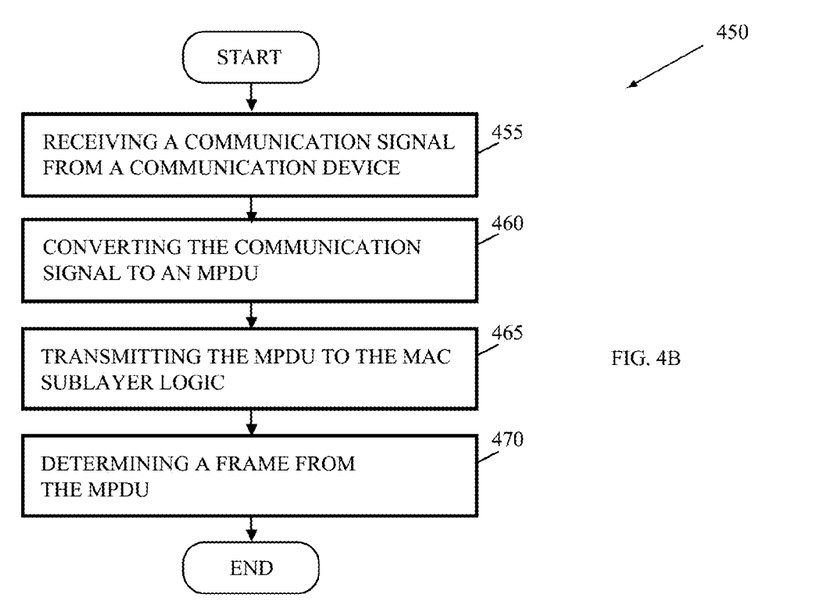

FIGS. 4A-B depict embodiments of flowcharts 400 and 450 to transmit, receive, and interpret communications with a beacon frame as the short frames illustrated in FIGS. 1A-F. Referring to FIG. 4A, the flowchart 400 may begin with receiving a frame from the frame builder comprising an index number (M) and a compressed SSID segment and communicating with the MAC sublayer logic to determine a preamble of the beacon frame. The MAC sublayer logic of the communications device may generate the frame as a management frame to transmit to a STA and may pass the frame as an MAC protocol data unit (MPDU) to a data unit builder that transforms the data into a packet that can be transmitted to the STA. The data unit builder may generate a preamble to prepend the PHY service data unit (PSDU) (the MPDU from the frame builder) to form a PHY protocol data unit (PPDU) for transmission (element 405). In some embodiments, more than one MPDU may be included in a PPDU.

The PPDU may then be transmitted to the physical layer device such as the transmitter 206 in FIG. 2 or the transceiver 1020, 1040 in FIG. 1 so the PPDU may be converted to a communication signal (element 410). The transmitter may then transmit the communication signal via the antenna (element 415).

Referring to FIG. 4B, the flowchart 450 begins with a receiver of a STA such as the receiver 204 in FIG. 2 receiving a communication signal via one or more antenna(s) such as an antenna element of antenna array 218 (element 455). The receiver may convert the communication signal into an MPDU in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 222. The OFDM extracts signal information from the plurality of subcarriers onto which information-bearing signals are modulated. Then, the demodulator such as the demodulator 224 demodulates the signal information via, e.g., BPSK, 16-QAM, 64-QAM, 256-QAM, QPSK, or SQPSK. And the decoder such as the decoder 226 decodes the signal information from the demodulator via, e.g., BCC or LDPC, to extract the MPDU (element 460) and transmits the MPDU to MAC sublayer logic such as MAC sublayer logic 202 (element 465). The PHY logic may also communicate with the MAC sublayer logic to indicate that the MPDU comprises a beacon frame.

The MAC sublayer logic may determine frame field values such as the index number (M) and the compressed SSID segment from the MPDU (element 470) such as fields in FIGS. 1C-F. The MAC sublayer logic may also determine frame field values such as the type and subtype field values of the beacon frame.

The following examples pertain to further embodiments. One example comprises a method. The method may involve generating more than one compressed service set identification (SSID) segments for an SSID based upon a single hash function; generating frames, each frame comprising one of the compressed SSID segments along with an index number associated with the one of the compressed SSID segments; and transmitting each of the frames.

In some embodiments, the method may further comprise transmitting, by the antenna, one of the frames prepended by a preamble, wherein the frame is a beacon frame or a probe request frame. In some embodiments, the method may further comprise storing, by the medium access control logic, at least part of one of the frames in memory. In many embodiments, the method may further comprise prepending, by physical layer logic, the one of the frames with a preamble to create a physical layer protocol data unit to transmit. In several embodiments, generating more than one compressed SSID segments comprises hashing the SSID to generate a long compressed SSID segment and determining the more than one compressed SSID segments from the long compressed SSID segment. And, in some embodiments, generating more than one compressed SSID segments comprises rotating the SSID by the index number of characters or bits to create a rotated SSID, and hashing the rotated SSID to generate a compressed SSID segment.

At least one computer program product to mitigate hashing collisions, the computer program product comprising a computer useable medium having a computer useable program code embodied therewith, the computer useable program code comprising computer useable program instruction, which when executed, are configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise medium access control logic to generate more than one compressed service set identification (SSID) segments for an SSID based upon a single hash function and generate frames, each frame comprising one of the compressed SSID segments along with an index number associated with the one of the compressed SSID segments; and a radio coupled with the medium access control logic to transmit each of the frames.

In some embodiments, the apparatus may further comprise an antenna to transmit one of the frames prepended by a preamble. In some embodiments, the medium access control logic comprises logic to store at least part of one of the frames in memory. In some embodiments, the apparatus may further comprise physical layer logic to prepend the frame with a preamble to create a physical layer protocol data unit to transmit. In some embodiments, the medium access control logic comprises logic to hash the SSID to generate a long compressed SSID segment and determine the more than one compressed SSID segments from the long compressed SSID segment. And in some embodiments of the apparatus, the medium access control logic comprises logic to rotate the SSID by the index number of characters or bits to create a rotated SSID and hash the rotated SSID to generate a compressed SSID segment.

Another example comprises a program product. The program product may comprise a medium containing instructions to mitigate hashing collisions. When executed, the instructions cause a receiver to perform operations, the operations comprising operations to: generate more than one compressed service set identification (SSID) segments for an SSID based upon a single hash function; generate frames, each frame comprising one of the compressed SSID segments along with an index number associated with the one of the compressed SSID segments; and transmit each of the frames.

In some embodiments, the program product may further comprise transmitting, by the antenna, one of the frames prepended by a preamble, wherein the frame is a beacon frame or a probe request frame. In some embodiments, the program product may further comprise storing, by the medium access control logic, at least part of one of the frames in memory. In many embodiments, the program product may further comprise prepending, by physical layer logic, the one of the frames with a preamble to create a physical layer protocol data unit to transmit. In several embodiments, generating more than one compressed SSID segments comprises hashing the SSID to generate a long compressed SSID segment and determining the more than one compressed SSID segments from the long compressed SSID segment. And, in some embodiments, generating more than one compressed SSID segments comprises rotating the SSID by the index number of characters or bits to create a rotated SSID, and hashing the rotated SSID to generate a compressed SSID segment.

Another example comprises a method. The method may involve receiving a first frame comprising a first compressed service set identification (SSID) segment along with a first index number; determining a first sought compressed SSID segment based upon the first index number, wherein the sought compressed SSID is associated with an access point; comparing the first sought compressed SSID segment against the first compressed SSID segment; and receiving a second frame comprising a second compressed SSID segment along with a second index number; determining a second sought compressed SSID segment based upon the second index number, wherein the second sought compressed SSID is associated with the access point; comparing the second sought compressed SSID segment against the second compressed SSID segment to determine whether the first frame and the second frame are associated with the access point.

In some embodiments, the method may further comprise decoding the first index and generating the first sought compressed SSID based upon an SSID of the access point and based upon the first index. In some embodiments, generating the first sought SSID comprises hashing from the SSID of the access point to generate a long compressed SSID segment and determining the first sought SSID from the long compressed SSID segment. And, in some embodiments, generating the first sought compressed SSID comprises rotating the SSID of the access point by the first index number of characters or bits to create a rotated SSID, and hashing the rotated SSID to generate a first sought compressed SSID.

At least one computer program product to mitigate hashing collisions, the computer program product comprising a computer useable medium having a computer useable program code embodied therewith, the computer useable program code comprising computer useable program instruction, which when executed, are configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a radio; and medium access control logic coupled with the radio to receive the first frame comprising a first compressed service set identification (SSID) segment along with a first index number; determine a first sought compressed SSID segment based upon the first index number, wherein the sought compressed SSID is associated with an access point; compare the first sought compressed SSID segment against the first compress SSID segment; and receive a second frame comprising a second compressed SSID segment along with a second index number; determine a second sought compressed SSID segment based upon the second index number, wherein the second sought compressed SSID is associated with the access point; compare the second sought compressed SSID segment against the second compressed SSID segment to determine whether the first frame and the second frame are associated with the access point.

In some embodiments, the medium access control logic comprises logic to hash the SSID of the access point to generate a long compressed SSID segment and determine the more than one compressed SSID segments from the long compressed SSID segment. And in some embodiments of the apparatus, the medium access control logic comprises logic to rotate the SSID by the index number of characters or bits to create a rotated SSID and hash the rotated SSID to generate a compressed SSID segment.

Another example comprises a program product. The program product may comprise a medium containing instructions to mitigate hashing collisions. When executed, the instructions cause a receiver to perform operations, the operations comprising operations to: receive a first frame comprising a first compressed service set identification (SSID) segment along with a first index number; determine a first sought compressed SSID segment based upon the first index number, wherein the sought compressed SSID is associated with an access point; compare the first sought compressed SSID segment against the first compress SSID segment; and receive a second frame comprising a second compressed SSID segment along with a second index number; determine a second sought compressed SSID segment based upon the second index number, wherein the second sought compressed SSID is associated with the access point; compare the second sought compressed SSID segment against the second compressed SSID segment to determine whether the first frame and the second frame are associated with the access point.

In some embodiments, the program product may further comprise operations to decode the second index, generate the second sought compressed SSID based upon an SSID of the access point and based upon the second index, hash from the SSID of the access point to generate a long compressed SSID segment, and determine the second sought SSID from the long compressed SSID segment. And, in some embodiments, the program product may further comprise operations to decode the second index, generate the second sought compressed SSID based upon an SSID of the access point and based upon the second index, rotate the SSID of the access point by the second index number of characters or bits to create a rotated SSID, and hash the rotated SSID to generate a second sought compressed SSID.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

The logic as described above may be part of the design for an integrated circuit chip. The chip design can be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the graphical computer programming language of the design by physical means (e.g., by providing a copy of the storage medium storing the design) or electronically (e.g., through the Internet) to such entities, directly or indirectly. The design may then be converted into the appropriate format (e.g., GDSII) for the fabrication of photolithographic masks, which typically include multiple copies of the chip design in question that are to be formed on a wafer. The photolithographic masks can be utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip can be mounted in a single chip package (such as a plastic carrier, with leads that are affixed to a motherboard or other higher level carrier) or in a multichip package (such as a ceramic carrier that has either or both surface interconnections or buried interconnections). In any case, the chip may then be integrated with other chips, discrete circuit elements, and/or other signal processing devices as part of either (a) an intermediate product, such as a motherboard, or (b) an end product. The end product can be any product that comprises integrated circuit chips, ranging from toys and other low-end applications to advanced computer products such as mobile devices having, e.g., a display, a keyboard or other input device, and a processor.

The disclosure of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
    generating more than one compressed service set identification (SSID) segments for an SSID based upon a single hash function, wherein generating more than one compressed SSID segments comprises rotating the SSID by the index number of characters or bits to create a rotated SSID, and hashing the rotated SSID to generate a compressed SSID segment;
    generating frames, each frame comprising one of the compressed SSID segments along with an index number associated with the one of the compressed SSID segments; and transmitting each of the frames.

2. The method of claim 1, further comprising transmitting, by the antenna, one of the frames prepended by a preamble, wherein the frame is a beacon frame or a probe request frame.

3. The method of claim 1, further comprising storing, by the medium access control logic, at least part of one of the frames in memory.

4. The method of claim 1, further comprising prepending, by physical layer logic, the one of the frames with a preamble to create a physical layer protocol data unit to transmit.

5. At least one computer program product for communication of a packet with a frame, the computer program product comprising a computer useable medium having a computer useable program code embodied therewith, the computer useable program code comprising computer useable program code configured to perform operations, the operations to:
    generate more than one compressed service set identification (SSID)segments for an SSID based upon a single hash function, wherein the operations to generate more than one compressed SSID segments comprise operations to rotate the SSID by the index number of characters or bits to create a rotated SSID, and hash the rotated SSID to generate a compressed SSID segment;
    generate frames, each frame comprising one of the compressed SSID segments along with an index number associated with the one of the compressed SSID segments; and
    transmit each of the frames.

6. A device comprising:
    medium access control logic to generate more than one compressed service set identification (SSID) segments for an SSID based upon a single hash function and generate frames, each frame comprising one of the compressed SSID segments along with an index number associated with the one of the compressed SSID segments, wherein the medium access control logic comprises logic to rotate the SSID by the index number of characters or bits to create a rotated SSID and hash the rotated SSID to generate a compressed SSID segment; and a radio coupled with the medium access control logic to transmit each of the frames.

7. The device of claim 6, further comprising an antenna to transmit one of the frames prepended by a preamble.

8. The device of claim 6, wherein the medium access control logic comprises logic to store at least part of one of the frames in memory.

9. The device of claim 6, further comprising physical layer logic to prepend the frame with a preamble to create a physical layer protocol data unit to transmit.

10. A method comprising:
receiving a first frame comprising a first compressed service set identification (SSID) segment along with a first index number;
determining a first sought compressed SSID segment based upon the first index number, wherein the first sought compressed SSID segment is associated with an access point;
comparing the first sought compressed SSID segment against the first compressed SSID segment; and
receiving a second frame comprising a second compressed SSID segment along with a second index number;
determining a second sought compressed SSID segment based upon the second index number, wherein the second sought compressed SSID segment is associated with the access point, wherein the first sought compressed SSID segment and the second sought compressed SSID segment have different values and represent an SSID of the access point; and
determining whether the first frame and the second frame are associated with the access point by comparing the second sought compressed SSID segment against the second compressed SSID segment;
further comprising decoding the first index and generating the first sought compressed SSID segment based upon an SSID of the access point and based upon the first index, wherein generating the first sought compressed SSID segment comprises rotating the SSID of the access point by the first index number of characters or bits to create a rotated SSID, and hashing the rotated SSID to generate a first sought compressed SSID segment.

11. The method of claim 10, wherein generating the first sought SSID comprises hashing from the SSID of the access point to generate a long compressed SSID segment and determining the first sought SSID from the long compressed SSID segment.

12. At least one computer program product for communication of a packet with a frame, the computer program product comprising a non-transitory computer useable medium having a computer useable program code embodied therewith, the computer useable program code comprising computer useable program instructions configured to perform operations when executed, the operations to:
receive a first frame comprising a first compressed service set identification (SSID) segment along with a first index number;
determine a first sought compressed SSID segment based upon the first index number, wherein the first sought compressed SSID segment is associated with an access point;
compare the first sought compressed SSID segment against the first compressed SSID segment; and
receive a second frame comprising a second compressed SSID segment along with a second index number;
determine a second sought compressed SSID segment based upon the second index number, wherein the second sought compressed SSID segment is associated with the access point, wherein the first sought compressed SSID segment and the second sought compressed SSID segment have different values and represent an SSID of the access point; and
determine whether the first frame and the second frame are associated with the access point by comparison of the second sought compressed SSID segment against the second compressed SSID segment
wherein the operations further comprise operations to decode the second index, generate the second sought compressed SSID segment based upon an SSID of the access point and based upon the second index by rotation of the SSID of the access point by the second index number of characters or bits to create a rotated SSID and hash of the rotated SSID to generate a second sought compressed SSID.

13. The at least one computer program product of claim 12, further comprising operations to decode the second index, generate the second sought compressed SSID based upon an SSID of the access point and based upon the second index, hash from the SSID of the access point to generate a long compressed SSID segment, and determine the second sought SSID from the long compressed SSID segment.

14. A device comprising:
a radio; and
medium access control logic comprising hardware coupled with the radio to receive a first frame comprising a first compressed service set identification (SSID) segment along with a first index number; determine a first sought compressed SSID segment based upon the first index number, wherein the first sought compressed SSID segment is associated with an access point; compare the first sought compressed SSID segment against the first compressed SSID segment; and receive a second frame comprising a second compressed SSID segment along with a second index number; determine a second sought compressed SSID segment based upon the second index number, wherein the second sought compressed SSID segment is associated with the access point, wherein the first sought compressed SSID segment and the second sought compressed SSID segment have different values and represent an SSID of the access point; and determine whether the first frame and the second frame are associated with the access point by comparison of the second sought compressed SSID segment against the second compressed SSID segment, wherein the medium access control logic comprises logic to rotate the SSID by the index number of characters or bits to create a rotated SSID and hash the rotated SSID to generate a compressed SSID segment.

15. The device of claim 14, wherein the medium access control logic comprises logic to hash the SSID of the access point to generate a long compressed SSID segment and determine the more than one compressed SSID segments from the long compressed SSID segment.

* * * * *